(No Model.)
S. J. HAYES.
PROCESS OF AND APPARATUS FOR GENERATING AND APPLYING ANESTHETIC VAPORS.
No. 509,849.          Patented Nov. 28, 1893.
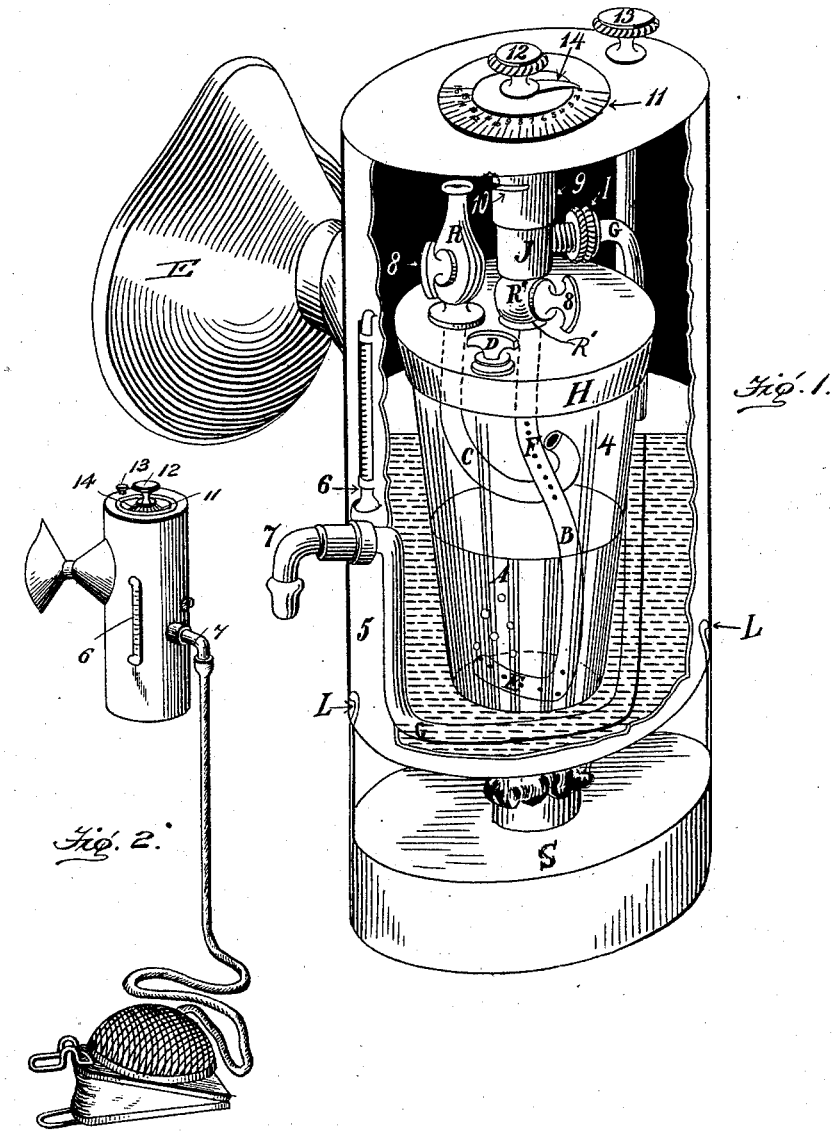

UNITED STATES PATENT OFFICE.

SAMUEL J. HAYES, OF PITTSBURG, PENNSYLVANIA.

PROCESS OF AND APPARATUS FOR GENERATING AND APPLYING ANÆSTHETIC VAPORS.

SPECIFICATION forming part of Letters Patent No. 509,849, dated November 28, 1893.

Application filed April 15, 1892. Serial No. 429,327. (No model.)

*To all whom it may concern:*

Be it known that I, SAMUEL J. HAYES, a citizen of the United States, residing at Pittsburg, in the county of Allegheny and State of Pennsylvania, have discovered and invented certain new and useful Improvements in Processes of and Apparatus for Generating and Administering Anæsthetic Vapors, set forth in my Letters Patent No. 257,866, dated May 16, 1882; and I do hereby declare the following to be a full, clear, and exact description thereof, reference being had to the accompanying drawings, in which—

Figure 1 is a perspective view of my improved generator, with a part of the outside jacket or casing broken away, to more clearly illustrate the internal devices contained within said generator, and Fig. 2 is an elevation showing the aerator combined with the generator and the tube which connects said devices.

My invention relates, first, to an improvement upon my process of preparing anæsthetic vapors, as specified in Letters Patent No. 257,866; and, secondly, a suitable apparatus adapted to the use of this my improved process.

In my former process of and apparatus for administering anæsthetics, as patented May 16, 1882, No. 257,866, there was no provision made for regulating the temperature of the vapor, or of the chloroform or other suitable narcotic, which is a necessity in consequence of the change of the temperature of the atmosphere in the different seasons of the year and climates, nor yet, was there sufficient provision made for regulating the percentage of the atmosphere or the percentage of the narcotic in the anæsthetic vapor. As the capacity or power of the atmosphere to receive, contain and convey chloroform or any other suitable narcotic, varies with the temperature of the same, therefore, the regulation of the temperature is of great importance in the preparation and administration of the anæsthetic. Hence, the object of my invention is, first, to secure the regulation and control of the temperature of the vapor or the chloroform or other suitable narcotic, or to increase the quantity or percentage of the chloroform or other narcotic in the anæsthetic vapor as may be needed in the advancing stages of anæsthesia, and, secondly, to regulate properly that temperature with use of a reliable thermometer.

I shall now describe my improved apparatus adapted to the use of this my improvement, or in preparing and administering this most agreeable and desirable anæsthetic vapor by this my improved process.

In the drawings, 5 designates an exterior casing, preferably made of metal in cylindrical form, although any other suitable material and shape may be used, and this casing is partially filled with a liquid bath, preferably of water, although any other liquid suitable for the purpose may be employed. Within this exterior casing 5 is suspended the closed receptacle 4 designed to contain the narcotic liquid, and this receptacle 4 is when in use partially submerged within the liquid-bath, leaving the upper part of the casing free or unobstructed, thus producing the chamber 1 above the bath and the receptacle, into which chamber 1 is discharged the anæsthetic vapor produced within the narcotic receptacle 4 in the manner presently described.

The narcotic receptacle 4 is preferably made of glass, or any other suitable material, and the upper end thereof is securely closed by means of a tight-fitting cap H. The narcotic liquid may be introduced into the receptacle 4 through a supply opening which is securely closed by means of the screw cap or plug D, shown by Fig. 1. To the middle of the cap H on the upper end of the narcotic receptacle is fixed a vertical tube J which has its lower end extended through the cap or so connected thereto as to communicate with the chamber in the receptacle 4. This tube J is provided at an intermediate point of its length with a transverse or radial slot, and on the tube is fitted a revoluble sheath or cut-off 9 which fits closely to the tube so that when it is turned to the proper position it will serve to close the slot in the tube J and thus prevent the escape of air into the outer chamber 4. Said sheath 9 is also provided with a radial slot 10 that is adapted to be brought into coincidence with the slot in the tube J when it is desired to permit air to pass into the outer chamber and to regulate the percentage of the narcotic thus discharged from the receptacle 4 which can be regulated or controlled by properly adjusting the sheath to vary the area of exposure of the slot in the tube J, as will be readily understood. This adjustment of the sheath 9 can be readily effected by means of the knob 12 which is secured to the upper end of the sheath in any suitable way, and this knob carries an index or pointer 14 which traverses a dial 11 fixed to the head of the shell or casing 5 and which is so graduated as to indicate the percentage of the chloroform, or other suitable narcotic, in the anæsthetic.

G is the air-inlet tube which is bent to extend under the narcotic receptacle 4 and have as much of its surface as possible submerged in the liquid bath, in order to affect the temperature of the air as it passes through said pipe G on its way to the narcotic receptacle, and one end of this air-pipe extends or passes through the side of the casing 5, said end of the air-pipe terminating in a branch 7 which provides for the convenient attachment of a connecting pipe or tube that leads to an aerator or air forcing device as shown by Fig. 2 and in my prior Patent No. 257,866, hereinbefore referred to. The other end of this air pipe is connected, by a swiveled coupling I, to the tube J; and from this tube J depends another air-tube B which communicates at its upper end with the tube J and which extends well into the receptacle 4 so that its lower end terminates near the bottom of the receptacle and below the surface of the liquid narcotic, indicated at A, in Fig. 1 of the drawings. This tube B is provided with a number of perforations F at an intermediate point of its length, and thus air under pressure from the aerator and pipe G can be supplied to the receptacle 4 below and above the narcotic therein.

C designates a discharge tube which depends from the cap H into the receptacle 4, the lower end of said tube C being turned up as indicated in Fig. 1 while its upper end is connected to a discharge nozzle arranged exterior to the receptacle 4 and projecting into the chamber 1 in the shell 5, said nozzle R being provided with a cock or valve 8 by adjusting which the nozzle can be closed. A similar cock or valve R′ is provided in the lower part of the tube J to enable the operator to cut-off communication between the receptacle 4 and said tube J.

To the shell or casing 5 is secured a thermometer 6, the bulb of which is placed within the shell or casing and so connected as to register the temperature of the vapor as it is housed or inclosed within the chamber 1 at all times.

Below the exterior shell or casing 5 is arranged a spirit lamp S which is adapted to be connected to the casing 5 by means of the spring catches L, and the lamp serves to heat the water or liquid bath in the casing 5 to any desired temperature, by which the temperature of any narcotic, or the temperature of the vapor, may be governed or regulated within the chamber 1, as may be desired while the vapor is being administered to the patient in accordance with the needs of the patient in the various stages of anæsthesia; but the same effect may be produced upon the temperature by applying external heat to the chamber 1 within the shell 5, or to chambers similar in design.

To the shell or casing 5 is secured in any suitable way the usual mouth or face piece E which communicates with the chamber 1 in said shell or casing 5; and in the upper head of the shell 5 is provided an inlet opening through a tube by which the water or other liquid can be introduced into the bath, said opening being closed by the plug or cap 13.

Having described my discovery and invention, I now desire to explain its operations: The heat being applied either in the water or other suitable liquid as placed within the chamber that surrounds the chamber 4, that has received the bottle or vessel containing the chloroform or other suitable narcotic, or by a suitable apparatus externally applied, just at the time the operator is about to administer the anæsthetic, as in the operation of generating and administering the attenuated vapor or anæsthetic, the air passing through or over the chloroform, or other narcotic, tends to lower the temperature of the atmosphere and vapor, and then diminishes its capacity or ability to receive, contain and convey the narcotic to the patient, and as the patient or subject usually needs more of the narcotic as the anæsthesia advances, therefore, the heat being applied as herein specified counteracts that tendency and gradually increases the temperature to meet the wants of the occasion, and is of very great importance and worth. The percentage or proportion of the atmosphere in the admixture of air and chloroform, or other suitable narcotic, is increased or dimished by the proper turning of the sheath after the valves indicated by 8, are turned vertical and the aerator referred to in my Patent No. 257,866 is being operated, and thus the percentage of the narcotic is also increased or diminished at the pleasure of the administrator and in accordance with the needs of the patient. The current of air under pressure from the aerator is warmed or heated to the desired or proper temperature as it passes through the bent or curved part of the pipe which is submerged in the water bath, and thus currents of warm air are supplied to the narcotic chamber in the vessel 4 and to the chamber 1 (when the slotted sheath 9 is adjusted in line with the slot in the tube J) in the upper part of the receptacle 5, above the vessel 4 and the bath in the said receptacle 5. The valves R and R′ being opened, and the sheath 9 adjusted so that its slot 10 coincides with the slot in the tube J and the indicator pointing to numeral 1 on the dial, the current of warm air is admitted from the pipe G into the tube J, whereupon a small volume of warm air passes through the tube B into the narcotic vessel 4 while the greater proportion of air passes through the slotted sheath into the chamber 1 of the vessel 5, above the narcotic vessel and the liquid bath. The current of warm air passes from the tube B through the perforations E, F, into the narcotic vessel; the current of air from the perforations E are discharged below the surface of the narcotic liquid in the vessel 4 and serves to break up the globules while the narcotized vapor arising from the narcotic liquid is commingled with currents of warm air issuing from the perforations F of the tube or pipe B. This narcotized vapor passes from the vessel 4 through the outlet pipe C and the faucet R, and this narcotized vapor from the vessel 4 is surcharged with the atmospheric air issuing from the slots in the tube J and sheath 9 before the anæsthetic vapor is permitted to pass from the generator through the mouth piece E, for administration to the patient. By turning the knob 12 the sheath 10 can be adjusted to regulate the proportion of warm atmospheric air which passes from the sheath 10 into the chamber 1, and through the tube B into the narcotic vessel; and thus the proportion of the narcotic in the anæsthetic vapor can be increased as the proportion of air is decreased, or vice versa, in accordance with the needs of the patient.

I am aware that the water bath has been used by Dr. Snow, and perhaps others, for the purpose of preventing to a limited extent the lowering of the temperature of the vapor, but I am not aware that it has ever previously been used for the purpose not only of counteracting the tendency to lower, but of increasing the temperature of the narcotic liquid and vapor so as to be suited to the condition of the patient in the progress of the anæsthesia.

Having described my improvement in my process of and apparatus for administering anæsthetics, what I now claim as my discovery and invention, and desire to receive by Letters Patent, is—

1. The process herein described of generating and applying anæsthetic vapors, which consists in warming a current of air and conducting the same below the surface of a narcotic liquid; and surcharging the narcotized vapor from said liquid by counter currents of warm air before leaving the generator, substantially as and for the purpose described.

2. The process herein described of generating and applying anæsthetic vapors, which consists in warming a current of air and conducting the same below the surface of a narcotic liquid in a closed vessel; commingling this narcotized vapor arising from said liquid by counter currents of warm air in said closed vessel; and finally surcharging the narcotized vapor with a regulated volume of warm atmospheric air before leaving the generator, substantially as and for the purpose described.

3. In an apparatus for generating anæsthetic vapors, the combination with an exterior vessel or casing, and a narcotic receptacle therein, of a tube which communicates with the interior of said narcotic receptacle and has an outlet for permitting air to pass into the exterior casing, means for regulating the volume of air which passes from said tube into the exterior receptacle, an air induction pipe connected to said tube for supplying air thereto to pass into the narcotic receptacle and to the exterior casing, and a discharge pipe connected to the narcotic receptacle to conduct narcotized vapor from said narcotic receptacle into the exterior casing, substantially as and for the purpose described.

4. In an apparatus for generating anæsthetic vapors, the combination with an exterior vessel or casing, of a closed narcotic receptacle situated within said exterior casing and provided with a discharge nozzle to convey the narcotized vapor from the narcotic receptacle into the exterior vessel, the air pipe or tube communicating with said narcotic receptacle and provided with an air-outlet opening arranged to permit a current of warm air to discharge in close proximity to the outlet nozzle of the narcotic receptacle, means for regulating the escape of air from said air tube into the exterior vessel, and an air-induction pipe connected to said valved air-tube, substantially as described.

5. The combination of an exterior vessel adapted to contain a water-bath, an interior closed receptacle designed to receive a liquid narcotic and provided with a discharge at its upper end, the air tube having means for regulating the escape of air into the external vessel and having a depending pipe which extends into said closed receptacle, and an air-induction pipe leading through the water bath in the exterior vessel and connected to the air-tube, substantially as and for the purpose described.

6. The combination of an external receptacle adapted to contain a water-bath, an interior closed receptacle therein having a discharge for the anæsthetic, an air-tube connected to the interior closed receptacle, and an air-induction pipe leading through said water bath and discharging into the air-tube, as and for the purpose set forth.

7. The combination with an external vessel, of the interior closed receptacle, the air-tube communicating with said receptacle, a slotted sheath fitted on said tube and carrying an exposed index or pointer adapted to traverse a disk on the external vessel, and an air-induction pipe connected to the air-tube, substantially as described.

8. The combination of an external vessel adapted to contain a water-bath, of the interior closed receptacle having a discharge for the anæsthetics, the air tube communicating with said closed receptacle, means for regulating the escape of air from said tube into the external vessel, an air-induction pipe leading through the water-bath and discharging into the air tube, and an air-forcing device connected to the air-induction pipe, as and for the purpose described.

9. The combination with an external vessel of the interior closed receptacle adapted to contain a liquid narcotic, a discharge pipe C in said receptacle and terminating in a nozzle, the air tube having the pendent perforated pipe extending into the closed receptacle, the air-induction pipe, and a filling tube leading into the bath, substantially as described.

10. An apparatus for generating and applying anæsthetic vapors, consisting of an external vessel the interior narcotic-receptacle provided with an outlet for the charged anæsthetic vapor which is delivered into the external vessel, an air-pipe leading into the closed narcotic vessel and provided with a discharge port which is arranged to deliver counter currents of air into the external vessel, an inlet pipe coupled to the aforesaid air-pipe, and a mouth or face piece communicating with the chamber of the external vessel to receive therefrom attenuated anæsthetic vapor, substantially as and for the purpose described.

11. In an apparatus for generating anæsthetic vapors, the combination with an exterior vessel and a closed narcotic receptacle within the same, of the slotted-air-tube J having an adjustable slotted sheath thereon to regulate the volume of air that passes from the tube J into the exterior vessel, the depending pipe B connected to said air tube J and having the perforations E, F, for supplying currents of air into the narcotic liquid both below and above said liquid, a discharge pipe C from said narcotic receptacle and having a nozzle arranged to discharge the narcotized vapor in the path of the current of air issuing from the tube J and the sheath, and an air-induction pipe connected to the air tube J, substantially as described.

In testimony whereof I affix my signature in presence of two witnesses.

SAMUEL J. HAYES.

Witnesses:
JOHN H. CRATTY,
WM. P. ROFF.